March 1, 1949. T. W. POOR ET AL 2,463,305
TRACTOR JACK
Filed Dec. 6, 1945
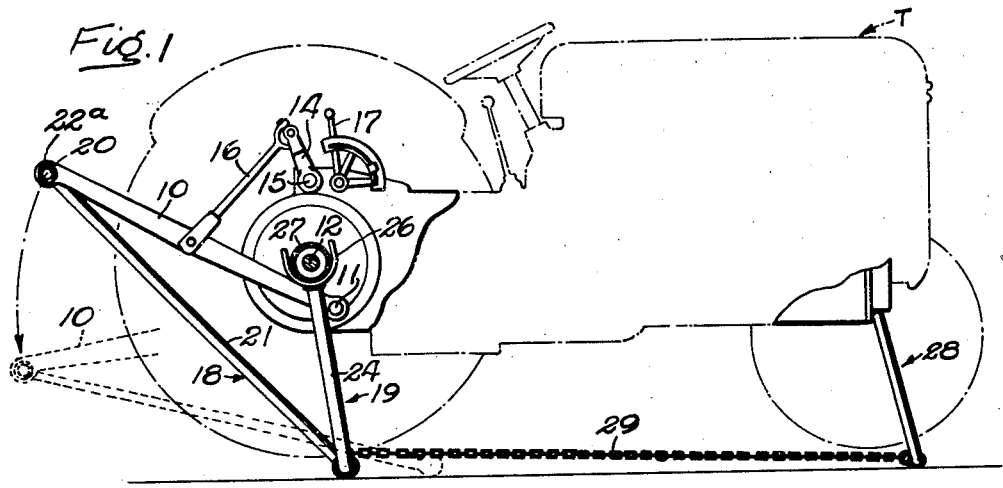
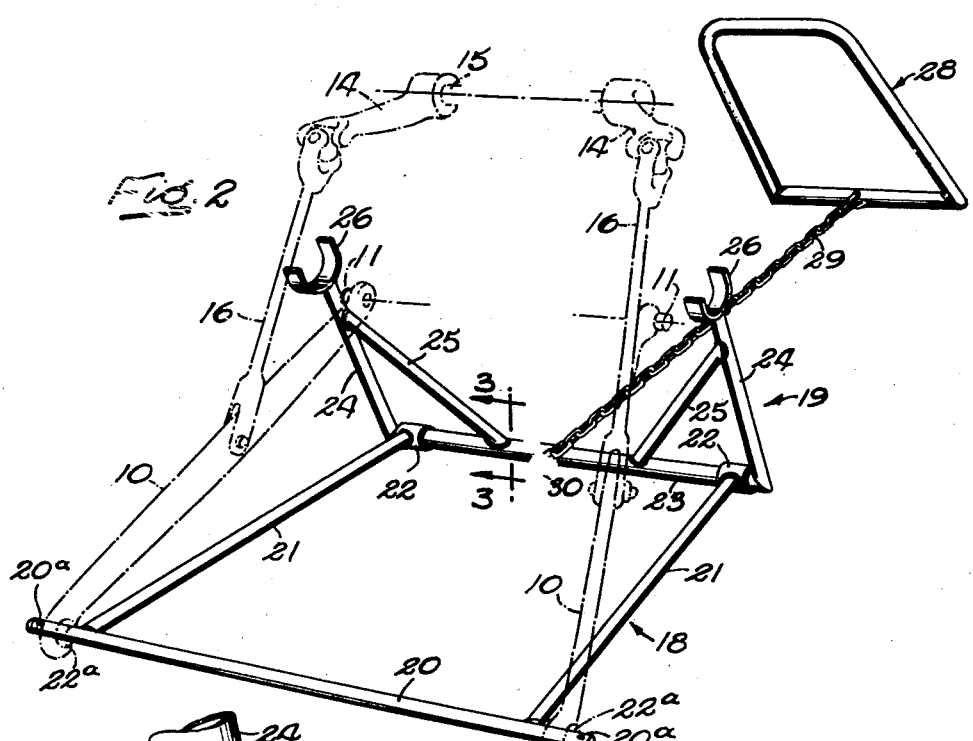
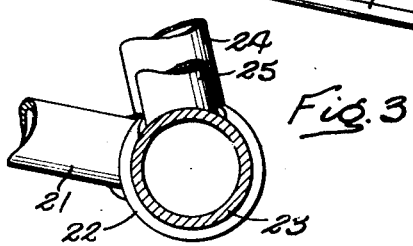
INVENTORS
Tom W. Poor
John E. Kisinger
By Carlson, Pitzner, Hubbard & Wolfe
ATTORNEYS Patented Mar. 1, 1949

2,463,305

UNITED STATES PATENT OFFICE 2,463,305

TRACTOR JACK

Tom W. Poor and John E. Kisinger, Stilwell, Kans.

Application December 6, 1945, Serial No. 633,140

2 Claims. (Cl. 254—94)

1

The present invention pertains to jacks for tractors. More particularly, it has to do with jacks for tractors adapted to utilize an auxiliary power unit on the tractor itself for effecting lifting by the jack. The tractor thus operates in such case to lift itself by its boot straps, so to speak.

The jack herein disclosed is an improvement on that disclosed in Poor et al. Patent No. 2,250,964, issued July 29, 1941. In general, the aim is to provide a jack of the type disclosed in the latter patent which embodies certain novel features that make it easier to maneuver the jack in positioning it for use and which enable it to better withstand the hard use and abuse which such a device encounters on a farm.

Further objects and advantages of the invention will become apparent as the following description proceeds, taken in connection with the accompanying drawings in which:

Figure 1 is a fragmentary side elevation of a tractor supported upon a jack embodying the present invention.

Fig. 2 is a perspective view of the jack of Fig. 1 with the same shown in lowered position and the associated power-operated linkage elements on the tractor appearing in phantom.

Fig. 3 is an enlarged detail sectional view taken substantially along the line 3—3 in Fig. 2.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

Referring more particularly to the exemplary embodiment of the invention illustrated in the drawings, there is indicated in broken lines a tractor T which in this instance happens to be the familiar Ford-Ferguson tractor. Such tractor was chosen as illustrative of the type to which jacks of the present invention are applicable in view of the fact that such tractors have power-operated linkages thereon as part of their regular equipment and with which the present jack is adapted to cooperate.

In the case of the tractor T illustrated, a pair of laterally spaced links 10 are arranged to trail side-by-side from the rear end portion of the tractor. The forward ends of such links are pivoted at 11 on the tractor for vertical swing, the pivot points being located below and somewhat

2 forward of the tractor's rear axle 12. The links 10 are arranged to be raised by a hydraulic power unit (not shown) such as is customarily included in Ford-Ferguson tractors. Such power units and their construction are well-known and understood in the art, being illustrated, for example, in Henry George Ferguson Patent No. 2,118,180, issued May 24, 1938. For the present, suffice it to say that crank arms 14 are fixed to opposite ends of a rock shaft 15 and connected by drop links 16 with the trailing links 10. Upon swinging a control handle 17 upward to the position shown, pressure fluid is admittted to a hydraulic ram (not shown) operatively connected to the rock shaft 15 so that the latter is turned to lift the links 10 to the full line position illustrated in Fig. 1. Upon pushing the handle 17 forward the ram is conditioned to permit gravity lowering of the links 10 to the dotted line position illustrated in Fig. 1.

Turning now to the jack itself, it includes a rear stand comprised of two rigid U-shaped frames which are respectively designated generally herein as 18 and 19. In the case of the frame 18 the transverse or intermediate member of the U is constituted by a rod 20 to which are welded or otherwise rigidly secured tubular side arms 21. The ends of the rod 20 project laterally beyond the side arms 21 (see Fig. 2) and are dimensioned for insertion in the apertured ball type sockets 22a on the trailing ends of the links 10. Such sockets are those commonly provided on the trailing links of a Ford-Ferguson tractor. It will be noted that no drawbar need be installed on the tractor when utilizing this present jack.

Sleeves 22 are welded or otherwise rigidly attached to the forward ends of the arms 21 and are telescoped over the transverse or intermediate member 23 of the other U-shaped frame 19. The latter member 23 is dimensioned to turn freely within the sleeves 22 so that the U-shaped frames 18 and 19 are thus pivoted together for free swinging movement with reference to each other about the longitudinal axis of the member 23.

To the ends of the member 23 are welded or otherwise rigidly fixed side arms 24 of the U-frame 19. These side arms are braced by diagonal struts 25, fixed at their opposite ends to the respective side arms and to the intermediate member 23. The members 23, 24 and 25 may all be made of tubular steel stock.

Fixed to the upper ends of the arms 24 are yokes 26 dimensioned to embrace the tractor's rear axle housing 27 (Fig. 1). The yokes 26 are sufficiently deep that the axle housing lies well within their confines, thus precluding the possibility of the tractor's slipping off the stand. Precision location of the rear jack stand laterally of the tractor is not required since the yokes 26 can embrace the rear axle housing 27 with some tolerance of displacement longitudinally of it. The spacing between the yokes 26 is, however, great enough, with reference to the length of the rear axle housing 27, that there is no opportunity to shift the stand laterally so far that there is any danger of overbalancing the tractor sideways when it is lifted.

Since the U-shaped frames 18 and 19 making up the rear stand of the jack are permanently connected together, and since each of these two frames is rigid in construction, the rear stand can readily be manipulated as a unit. To position the rear stand for lifting the tractor, the operator grasps the frame 18 and shoves the stand underneath the tractor. The U-frame 19 is swung upward to present the yokes 26 to the rear axle housing and then the U-frame 18 given a tug in a rearward direction so that the frame 19 is straightened up slightly with the yokes 26 engaging the axle housing. The ends of the bar 20 are thrust into the sockets 22a on the tractor links 10 and retaining pins (not shown) dropped into the holes 20a in the ends of the rod 20.

When the rear jack stand is thus installed, the operator ned only pull back on the hand lever 17 to cause the hydraulic unit in the tractor to raise the links 10. As the latter links rise, the tractor is lifted by the rocking of the U-frame 19 about its lower member 23.

It will be observed that the arms 24 of the U-frame 19 are somewhat longer than the spacing between the rear axle housing 27 and the ground so that they will be inclined rearwardly when the stand is positioned beneath the tractor. Even after the U-frame 19 has been rocked forwardly somewhat in raising the tractor, the arms 24 are still somewhat inclined as shown in Fig. 1.

If desired, a front stand 28 may also be included in the jack. As illustrated, this front stand may be a simple rectangular frame made of tubular steel stock. It is dimensioned to be inclined rearwardly at an angle which is preferably somewhat greater than the angle of the arms 24 on the U-frame 19 when the upper end of the front stand 28 is lodged in the angle between the crankcase and a securing flange at the front end of the tractor.

A chain 29 detachably connects the front and rear stands, being shown as secured to the front stand at one end and hooked over a peg 30 on the transverse member 23 included in the rear stand.

When both the front and rear stands are used, raising of the hydraulically operated links 10 rocks the tractor forward and upward on the two stands simultaneously to the position shown in Fig. 1 and in which all four wheels of the tractor are free of the ground.

To lower the tractor it is necessary merely to thrust the hand control lever 17 forward so that the links 10 are free to descend under the load imposed on them, the links swinging down to approximately the dotted line position shown in Fig. 1. Having thus removed the weight from the jack, it is but the work of a moment to disconnect the ends of the bar 20 from the links 10, disengage yoke 26 so the stand 19 falls flat and then pull the jack out from under the tractor.

It will be recognized that the dotted outline of Figure 1 is of convenience in showing only the movement of the jack members relative to the tractor, since the transverse member 23 actually stays fixed with respect to the ground during elevation of the tractor into the position shown.

We claim as our invention:

1. In a jack for a tractor having a pair of laterally-spaced, vertically-swingable, power-operated links trailingly pivoted on its rear end portion, a rear end stand comprising, in combination, a pair of rigid U-shaped frames, and means pivotally connecting the outer ends of the arms of one U to the transverse portion of the other U, whereby the resultant assembly may be readily maneuvered as a unit in moving it into and out of position beneath the rear end of the tractor, the intermediate portion of said one U being constituted by a rod projecting at opposite ends beyond the side arms of such U in position for attachment to the trailing ends of the tractor links.

2. In a jack for a tractor having a pair of laterally-spaced, vertically-swingable, power-operated, links trailingly pivoted on its rear end portion, a rear end stand comprising, in combination, first and second rigid U-shaped frames, said first frame being adapted for upward facing and said second frame being adapted for facing generally downward, means including sleeves for pivotally connecting the outer ends of the arms of the second U to the transverse portion of the first U, to minimize lateral displacement therebetween and to enable the resultant assembly to be readily maneuvered as a unit in moving it into and out of position beneath the rear end of the tractor, means at the outer ends of the intermediate portion of said second U for attaching the same to the trailing ends of the tractor links, and the upper ends of the arms of said first U having yokes fixed thereon to embrace the rear axle housing of the tractor.

TOM W. POOR.
JOHN E. KISINGER.

REFERENCES CITED

The following references are of record in the file of this patent:

UNITED STATES PATENTS

| Number | Name | Date |
|---|---|---|
| 2,250,964 | Poor | July 29, 1941 |
| 2,348,743 | McCue | May 16, 1944 |